(12) United States Patent
Childs et al.

(10) Patent No.: US 7,757,112 B2
(45) Date of Patent: Jul. 13, 2010

(54) SYSTEM AND METHOD FOR BOOTING ALTERNATE MBR IN EVENT OF VIRUS ATTACK

(75) Inventors: Philip Lee Childs, Raleigh, NC (US); Mark Charles Davis, Durham, NC (US); Steven Dale Goodman, Raleigh, NC (US); Joseph Wayne Freeman, Raleigh, NC (US); Randall Scott Springfield, Chapel Hill, NC (US); Rod David Waltermann, Rougemont, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 507 days.

(21) Appl. No.: 11/394,278

(22) Filed: Mar. 29, 2006

(65) Prior Publication Data
US 2008/0046781 A1 Feb. 21, 2008

(51) Int. Cl.
*G06F 12/14* (2006.01)
(52) U.S. Cl. .................. 714/5; 713/2; 714/42
(58) Field of Classification Search ............ 713/2; 714/42
See application file for complete search history.

(56) References Cited
U.S. PATENT DOCUMENTS

| | | | |
|---|---|---|---|
| 5,509,120 A | 4/1996 | Merkin et al. ............ 395/186 |
| 5,701,477 A | 12/1997 | Chejlava, Jr. ............ 395/652 |
| 5,974,567 A | 10/1999 | Dickson, Jr. et al. ......... 714/27 |
| 6,085,318 A * | 7/2000 | Vander Kamp et al. ........ 713/1 |
| 6,205,558 B1 | 3/2001 | Sobel ..................... 714/15 |
| 6,415,382 B1 | 7/2002 | Kwan ..................... 713/2 |
| 6,560,701 B1 | 5/2003 | Berstis et al. .............. 713/2 |
| 6,792,556 B1 * | 9/2004 | Dennis ..................... 714/6 |
| 6,802,028 B1 | 10/2004 | Ruff et al. ................. 714/38 |
| 6,862,681 B2 | 3/2005 | Cheston et al. ............. 713/2 |
| 7,024,581 B1 * | 4/2006 | Wang et al. ................. 714/2 |
| 7,219,257 B1 * | 5/2007 | Mahmoud et al. ............ 714/6 |
| 2002/0059498 A1 * | 5/2002 | Ng et al. ................... 711/112 |
| 2002/0166059 A1 * | 11/2002 | Rickey et al. .............. 713/200 |
| 2003/0014619 A1 | 1/2003 | Cheston et al. ............. 713/1 |
| 2004/0153689 A1 * | 8/2004 | Assaf ....................... 714/1 |
| 2004/0153840 A1 | 8/2004 | Buchanan, Jr. et al. ........ 714/42 |
| 2004/0255106 A1 * | 12/2004 | Rothman et al. ............. 713/1 |
| 2005/0050313 A1 | 3/2005 | Chen et al. ................. 713/2 |
| 2005/0066145 A1 * | 3/2005 | Han et al. ................ 711/173 |
| 2006/0041738 A1 * | 2/2006 | Lai ........................ 713/2 |
| 2007/0011493 A1 * | 1/2007 | Du et al. .................. 714/36 |

* cited by examiner

*Primary Examiner*—Scott T Baderman
*Assistant Examiner*—Chae Ko
(74) *Attorney, Agent, or Firm*—John L. Rogitz

(57) ABSTRACT

In the event of a virally infected MBR on a hard disk drive that might prevent booting, a service MBR in a hidden protected area (HPA) can be used to boot a service O.S., and then the service MBR can be replaced with a previously backed-up MBR, also in the HPA, to mount any missing partitions.

14 Claims, 3 Drawing Sheets

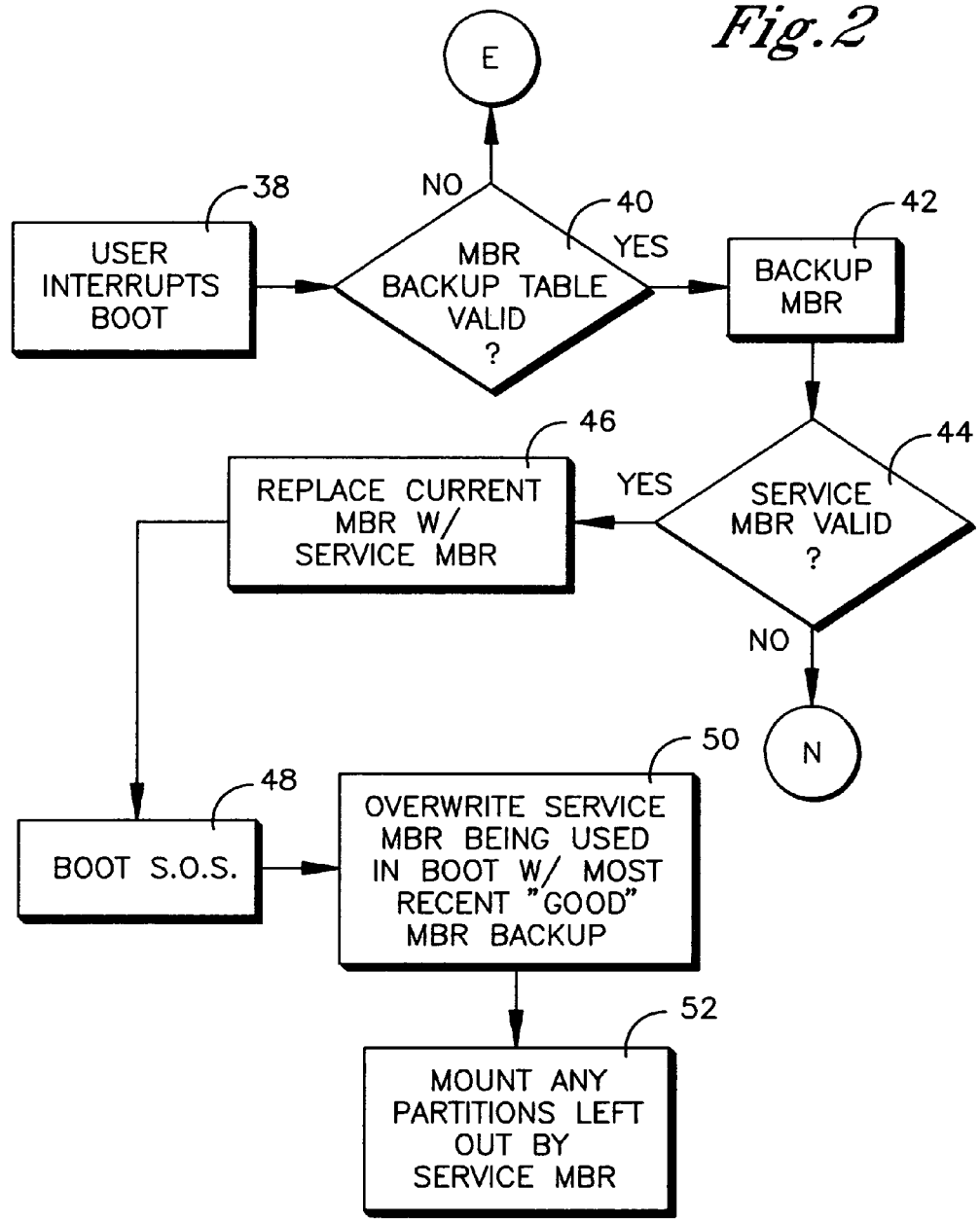

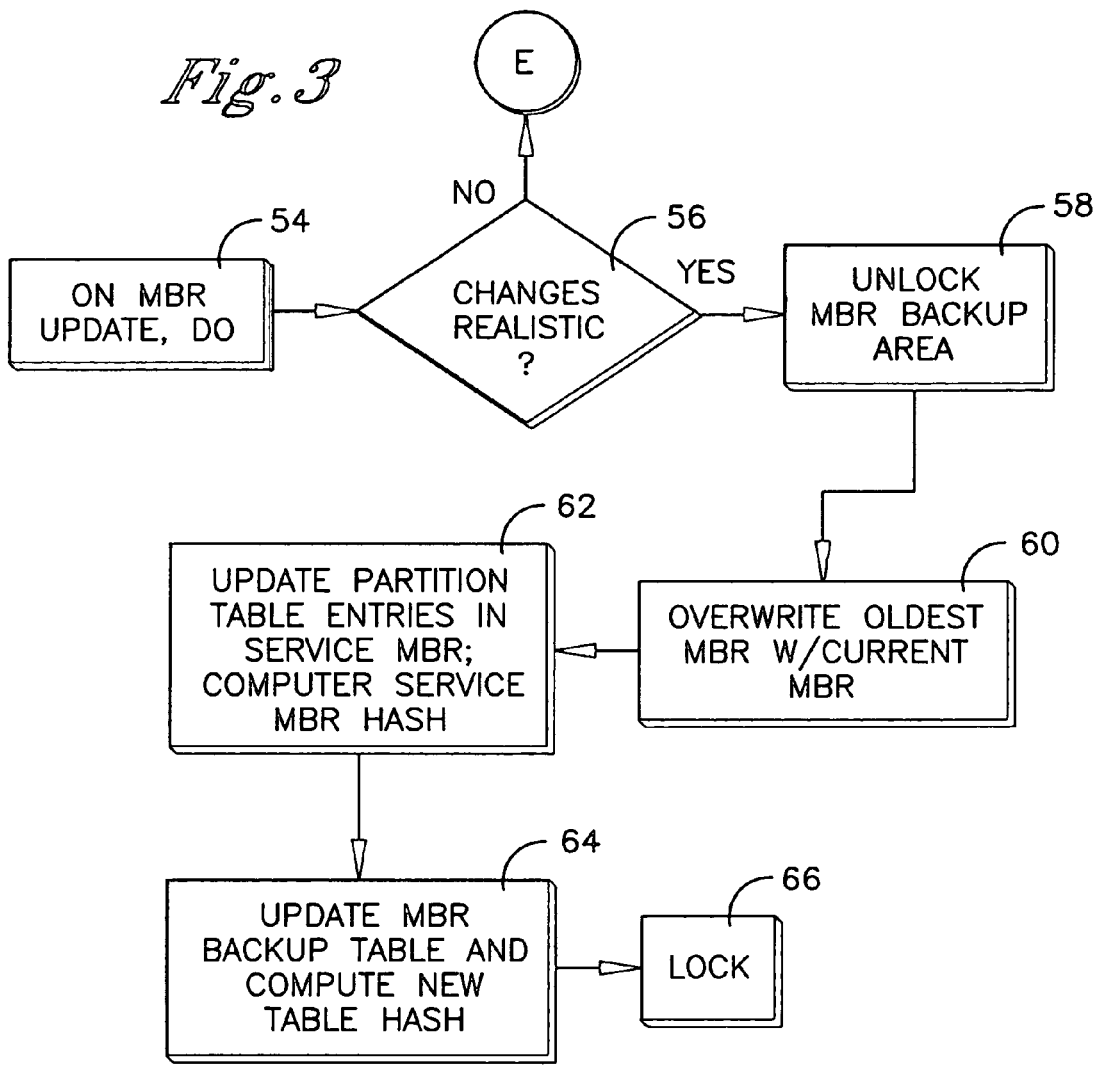

SYSTEM AND METHOD FOR BOOTING ALTERNATE MBR IN EVENT OF VIRUS ATTACK

FIELD OF THE INVENTION

The present invention relates generally to booting operating systems in computers.

BACKGROUND OF THE INVENTION

When a computer is turned on, a boot loader such as a basic input-output system (BIOS) that is stored in non-volatile solid state memory of the computer is invoked to begin what is known as a "boot" process, in which various initialization chores are undertaken. Among the most important of these chores is the copying of an operating system from disk storage of the computer over into typically a volatile solid state memory of the computer, for execution of the operating system by the processor of the computer when the computer is being used. When the computer is turned off or when it is "re-booted", the operating system is flushed from the memory. By executing the operating system from the relatively fast memory instead of from the disk, computer operations are accelerated.

An essential tool in booting is the Master Boot Record (MBR), which BIOS typically accesses early on in the boot process from secondary storage. In current implementations the MBR may be stored in the first 63 sectors of the hard disk drive, with a partition boot record (PBR) being stored in succeeding disk sectors. The MBR contains a record of disk locations of various O.S. data that BIOS must know to complete the boot, including a partition table, which contains the layout of data on the disk. The partition table may have space for, e.g., four partitions, with each entry including the partition size, marker if the partition is the boot partition, and type that defines the file system.

As recognized by the present invention, a malevolent virus might be designed to zero out the first 63 sectors of a disk or to otherwise destroy the MBR and thus prevent booting. As further recognized herein, while the MBR can be backed up to external storage, restoring it requires locating and loading the information from external storage, which can take time, and furthermore depending on how frequently the user remembers to back up the MBR, the externally-stored copy might be outdated. With these critical recognitions in mind, the invention herein is provided.

SUMMARY OF THE INVENTION

A computer medium stores logic that includes receiving a boot interrupt signal, and overwriting a current master boot record (MBR) with a service MBR in response. The service MBR is used to boot a service operating system, and then is replaced with a previously backed-up MBR.

If desired, in some implementations the logic can include accessing the previously backed-up MBR to mount any partitions not mounted when using the service MBR. The service MBR and previously backed-up MBR may be stored in a secondary storage in a hidden partition area (HPA).

In non-limiting implementations the logic can include backing up the current MBR prior to overwriting it with the service MBR. The current MBR may be backed up only if a MBR backup table is first determined to be valid. Also, the current MBR can be overwritten with the service MBR only if the service MBR is first determined to be valid.

In some implementations described further below, the previously backed-up MBR can be one of plural previously backed-up MBRs, with the previously backed-up MBRs being stored on a secondary storage in a HPA. The current MBR can be backed up when it changes by overwriting an oldest one of the previously backed-up MBRs with the current MBR. The service MBR can also be modified if, for example, a partition table in the current MBR changes.

In another aspect, a computer system includes a boot loader such as but not limited to BIOS, and a secondary storage such as but not limited to a hard disk drive that stores a user operating system (UOS) and a service operating system (SOS). A main memory can be provided, and the boot loader executes a boot sequence by accessing a current master boot record (MBR) to load an operating system from the secondary storage into the main memory. The boot loader, in response to a boot interrupt signal, replaces the current MBR with a service MBR stored on the secondary storage, loads the SOS, replaces the service MBR with a previously backed-up MBR on the secondary storage, and then uses the previously backed-up MBR to mount any partitions not mounted by the service MBR.

In yet another aspect, a computer system includes means for replacing a virally infected current master boot record (MBR) with a service MBR stored in a hidden protected area (HPA) of a secondary storage. The system also includes means for mounting a partition into a main memory using the service MBR, and means for overwriting the service MBR with a previously backed-up MBR. Means are provided for using the previously backed-up MBR to mount partitions that were not mounted by using the service MBR.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is flow chart of a non-limiting implementation of the logic for booting to the service partition; and FIG. 3 is flow chart of a non-limiting implementation of the logic for backing up the master boot record (MBR) to secondary storage such as hard disk.

DETAILED DESCRIPTION OF THE PREFERRED EMBODIMENT

Figure 1:
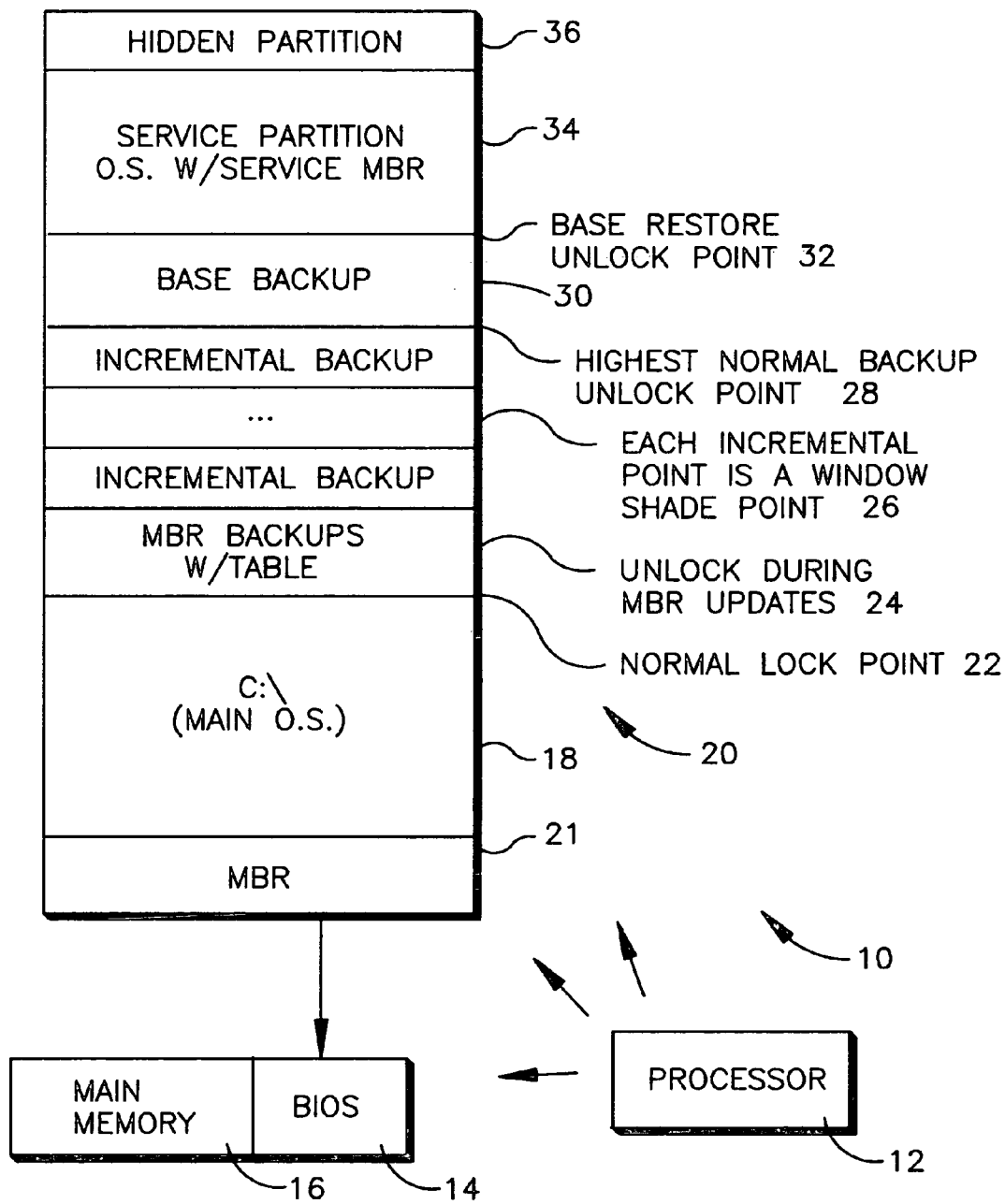
FIG. 1 is a block diagram of a non-limiting architecture of the present invention.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12, which may be, without limitation, a PowerPC processor available from Lenovo Corporation (or other processors made by, e.g., Intel or AMD and common to the industry). During power-on the processor 12 executes a boot loader such as a basic input/output system (BIOS) program 14 that may be stored in a main computer memory 16, to load into memory 16 a main operating system 18 (such as Windows XP®) in a secondary data store 20 such as a hard disk drive or flash memory or other secondary store. As shown in FIG. 1, the main operating system 18 may be located in a partition of the secondary data store 20 labelled as a "C drive" that begins just after an initial group 21 of sectors holding a master boot record (MBR) and if desired a partition boot record (PBR). The MBR can hold a partition table having space for up to four partitions, although FIG. 1 shows only a single partition (the "C" drive) for clarity.

In the non-limiting architecture shown in FIG. 1, above what is referred to herein as a "normal" lock point 22 is a hidden protected area (HPA) 24 containing MBR backups derived in accordance with logic below, along with a MBR backup table listing the backups, with the table being stored in a location known to the booter (e.g., BIOS). The "normal" lock point 22 can be established by, e.g., a system manufacturer who establishes a SetMax command at the lock point 22 so that the area 24 holding MBR backups appears hidden or nonexistent on the secondary storage 20 once full system startup has occurred, protecting the area 24 (and areas above it in FIG. 1) from destruction, virus infection, or any other damage that would affect system performance. Accordingly, the SetMax command includes data representing the boundary of the location of the normal lock point 22 in any suitable format, e.g., by logical block address (LBA), sector/cylinder/head, etc., such that when SetMax is set, disk regions beyond the normal lock point 22 defined in the SetMax command effectively are truncated, i.e., are not listed by the secondary storage as being part of the storage when, for example, a user operating system might query the storage when implemented by a HDD for its contents.

Above the area 24 of MBR backups may be one or more areas 26 holding incremental backups, i.e., backups of new information added to the original image in a given period of time. As indicated in FIG. 1, each incremental point may be colloquially referred to as a "window shade point." Above the highest typical backup lock point 28 on the secondary storage 20 may be a base backup area 30, which holds the original image of applications, operating systems, etc. provided on the secondary storage 20, and above a base restore unlock point 32 may be a service operating system (SOS) partition 34 that can hold a SOS such as Windows PE®. Hidden partition information such as disk operating system (DOS) information can be stored in an area 36 above the SOS area 34 if desired.

With the above non-limiting architecture in mind, attention is drawn to FIG. 2, which shows the logic that can be stored on a computer medium (such as but not limited to BIOS 14 or main memory 16) and implemented by, e.g., BIOS to complete booting if the MBR in the MBR sector group 21 has been damaged by a virus. Starting at block 38, a potential indication that the MBR in the initial sector group 21 is damaged is received by, e.g., a user interrupting the boot flow. One of the reasons booting may be interrupted by a user is that the user might receive a computer message that the secondary storage is corrupt.

Proceeding to decision diamond 40, if desired it can be determined whether the backup table in the MBR backup area 24 is valid. This can be done by comparing a hash of the table with a stored hash that has been previously derived as will be discussed below in reference to FIG. 3.

If the test at decision diamond 40 fails, error is returned and corrective action can be undertaken. The corrective action can be the reconstitution of a valid MBR as follows. Using the structures derived from the logic of FIG. 3, explained further below, a starting logical block address (LBA) of a partition in the partition table can be accessed and used to access the partition. The partition is read to determine whether it has a valid partition header partition boot record (PBR) to ensure that the partition is the one indicated in the partition table. The data found at the location pointed to can also be compared to the data in the most recent backup for that partition, and if all three agree; then it can be surmised that the correct partition starting point has been identified and the "correct" MBR reconstituted accordingly.

When the test at decision diamond 40 is positive, the MBR being used is backed up at block 42, on the chance that the MBR is not corrupt and the user interrupted boot for other reasons. Then, at decision diamond 44 it may be determined whether the service MBR, which is stored in a location of the service partition 34 known to BIOS, is valid. This test can be accomplished by comparing a hash of the service MBR with a stored hash that has been previously derived as will be discussed below in reference to FIG. 3.

If the service MBR is invalid, error is returned, but otherwise the logic flows to block 46 to overwrite the current MBR in the initial sector group 21 with the service MBR. The service O.S. is then booted into memory 16 from the service partition 34 at block 48. The service MBR makes a portion of the HPA appear as a standard partition, such that it can be assigned a driver letter and boot a normal (non-HPA aware) operating system.

Continuing to block 50, the service MBR now being used in the initial sector group 21 is overwritten with the most recent valid MBR in the MBR backup area 24. As set forth further below in reference to FIG. 3, several (e.g., ten) MBRs may be backed up in the backup area 24, and the most recent valid one is used at block 50. To determine the most recent valid MBR, the MBRs are examined, most recent one first, for validity, and if the most recent MBR is invalid (e.g., all zeroes or other pattern that indicates viral infection), then the next most recent MBR is examined, and so on.

Concluding at block 52, any partitions not mounted by using the service MBR can now be mounted by using the most recent valid backed-up MBR that replaced the service MBR at block 50. Thus, it may now be recognized that the original user partitions (e.g., four) are mounted by iterating on the number of partitions to mount in such a way that for each new partition, the partition table in the MBR is updated, the respective partition is mounted and then the next partition table entry is updated and its partition mounted and so on until all original user partitions are mounted.

FIG. 3 shows that at block 54 a do loop is entered when the MBR in use (i.e., the MBR in the initial sector group 21) is to be updated as indicated by, e.g., a driver that is configured to detect changes to the partition table or other portion of the MBR. At decision diamond 56, it is determined whether the changes are realistic, e.g., by determining whether the changes consist of one or more data patterns such as all zeroes that indicate viral infection. Assuming the changes are realistic, the MBR backup area 24 is unlocked by BIOS at block 58, and the oldest MBR in the backup area is overwritten with the new MBR at block 60.

Proceeding to block 62, any partition table entries in the service MBR that require updating, as indicated by the newly backed-up MBR, are updated, and a hash of the service MBR is then computed and stored for use as previously described in decision diamond 44 of FIG. 2. Also, at block 64 the MBR table in the MBR backup area 24 is updated to reflect the overwriting operation at block 60, and a hash of the table is then computed and stored for use as previously described in decision diamond 40 of FIG. 2. The MBR backup area 24 is then locked at block 66.

While the particular SYSTEM AND METHOD FOR BOOTING ALTERNATE MBR IN EVENT OF VIRUS ATTACK is herein shown and described in detail, it is to be understood that the invention is limited by nothing other than the appended claims.

What is claimed is:

1. A computer medium storing logic comprising:
receiving a boot interrupt signal to interrupt a boot loader invoking a current master boot record (MBR);
in response to the boot interrupt signal, determining whether a data structure listing plural backed-up MBRs is valid;
in response to a determination that the data structure is valid, backing up the current MBR and furthermore overwriting a current master boot record (MBR) with a service MBR;
using the service MBR, booting a service operating system; and
replacing the service MBR with a previously backed-up MBR, wherein the current MBR is overwritten with the service MBR only if the service MBR is first determined to be valid;
in response to a determination that the data structure is not valid, testing at least one backed-up MBR by accessing a partition using a partition table of the backed-up MBR;
determining whether the partition has a valid partition header partition boot record (PBR) to ensure that the partition is the partition indicated in the partition table;
comparing data found in the partition to data in a most recent backup of the partition, and if at least the data found in the partition and the data in the most recent backup of the partition agree, replacing the current MBR with the backed-up MBR.

2. The medium of claim 1, wherein the logic further comprises:
at least in part by accessing the previously backed-up MBR, mounting any partitions not mounted when using the service MBR.

3. The medium of claim 1, wherein the service MBR and previously backed-up MBR are stored in a secondary storage in a hidden partition area (HPA).

4. The medium of claim 1, wherein the data structure is a MBR backup table and the current MBR is backed up only if the MBR backup table is first determined to be valid.

5. A computer system, comprising:
at least one boot loader;
at least one secondary storage storing at least a user operating system (UOS) and a service operating system (SOS); and
at least one main memory, the boot loader being configured to execute a boot sequence at least in part by accessing a current master boot record (MBR) to load an operating system from the secondary storage into the main memory, the boot loader, at least in part in response to a boot interrupt signal, replacing the current MBR with a service MBR stored on the secondary storage only if a data structure listing backed-up MBRs is first determined to be valid, loading the SOS, replacing the service MBR with a previously backed-up MBR on the secondary storage, and then using the previously backed-up MBR to mount any unmounted partitions, wherein the previously backed-up MBR is one of plural previously backed-up MBRs listed in the data structure, the previously backed-up MBRs being stored on the secondary storage;
in response to a determination that the data structure is not valid, testing at least one backed-up MBR by accessing a partition using a partition table of the backed-up MBR;
determining whether the partition has a valid partition header partition boot record (PBR) to ensure that the partition is the partition indicated in the partition table;
comparing data found in the partition to data in a most recent backup of the partition, and if at least the data found in the partition and the data in the most recent backup of the partition agree, replacing the current MBR with the backed-up MBR.

6. The system of claim 5, wherein the service MBR and previously backed-up MBR are stored in the secondary storage in a hidden partition area (HPA).

7. The system of claim 6, wherein the current MBR is backed up to the secondary storage prior to overwriting it with the service MBR.

8. The system of claim 7, wherein the current MBR is backed up only if a MBR backup table is first determined to be valid.

9. The system of claim 5, wherein the current MBR is replaced with the service MBR only if the service MBR is first determined to be valid.

10. The system of claim 5, wherein a current MBR is backed up if the current MBR changes by overwriting an oldest one of the previously backed-up MBRs with the current MBR.

11. The system of claim 10, wherein the service MBR is modified at least if a partition table in the current MBR changes.

12. A computer system, comprising:
means for replacing a virally infected current master boot record (MBR) with a service MBR stored in a hidden protected area (HPA) of a secondary storage but only if a data structure listing previously backed-up MBRs is first determined to be valid;
means for mounting at least one partition into a main memory using the service MBR;
means for overwriting the service MBR with a previously backed-up MBR; and
means for using the previously backed-up MBR to mount at least one partition not mounted by using the service MBR, wherein the previously backed-up MBR is one of plural previously backed-up MBRs, the previously backed-up MBRs being stored on the secondary storage, a current MBR being backed up if the current MBR changes by overwriting an oldest one of the previously backed-up MBRs with the current MBR;
in response to a determination that the data structure is not valid, testing at least one backed-up MBR by accessing a partition using a partition table of the backed-up MBR;
determining whether the partition has a valid partition header partition boot record (PBR) to ensure that the partition is the partition indicated in the partition table;
comparing data found in the partition to data in a most recent backup of the partition, and if at least the data found in the partition and the data in the most recent backup of the partition agree, replacing the current MBR with the backed-up MBR.

13. The system of claim 12, wherein the current MBR is replaced with the service MBR only if the service MBR is first determined to be valid.

14. The system of claim 12, wherein the service MBR is modified at least if a partition table in the current MBR changes.

* * * * *